US006315429B1

(12) United States Patent   (10) Patent No.: US 6,315,429 B1
Grandolfo   (45) Date of Patent: Nov. 13, 2001

(54) UNDERWATER LIGHTING SYSTEM

(75) Inventor: Lou Grandolfo, Galveston, TX (US)

(73) Assignee: Aquatic Attractor Inc., Galveston, TX (US)

( * ) Notice: Subject to any disclaimer, the term of this patent is extended or adjusted under 35 U.S.C. 154(b) by 0 days.

(21) Appl. No.: 09/418,919

(22) Filed: Oct. 15, 1999

(51) Int. Cl.$^7$ .................................................. F21V 31/00
(52) U.S. Cl. ........................ 362/158; 362/263; 362/267
(58) Field of Search ........................... 362/96, 101, 158, 362/267, 318, 263, 253; 43/17.5; 340/985, 986

(56) References Cited

U.S. PATENT DOCUMENTS

| 867,256 | 10/1907 | Dion . | |
|---|---|---|---|
| 1,192,001 | 7/1916 | Ryan . | |
| 1,338,528 | 4/1920 | Reinewald . | |
| 2,097,357 | 10/1937 | Watts . | |
| 2,709,217 | * 5/1955 | McCluskey | 362/101 |
| 2,757,276 | 7/1956 | Campbell . | |
| 3,949,213 | * 4/1976 | Paitchell | 362/101 |
| 4,187,533 | 2/1980 | Hampton | 362/257 |
| 4,190,976 | 3/1980 | Hurt | 43/17.5 |
| 4,598,346 | 7/1986 | Bodde | 362/267 |
| 5,213,410 | 5/1993 | Acks | 362/269 |
| 5,386,355 | 1/1995 | Acks | 362/267 |
| 5,651,209 | 7/1997 | Rainey | 43/17.5 |
| 5,934,796 | 8/1999 | Quereau | 362/318 |

* cited by examiner

Primary Examiner—Y Quach Lee
(74) Attorney, Agent, or Firm—Bracewell & Patterson, L.L.P.

(57) ABSTRACT

A high intensity light is mounted and sealed in a polyvinyl chloride (PVC) receptacle and extension system. The receptacle is adapted to be anchored on the bottom of a channel or an underwater area adjacent to a structure which provides alternating current (AC) power from a shoreside mains. The high intensity lamp may be sealed within a transparent enclosure, but is preferably left exposed to minimize sealife growth on the lamp. The PVC receptacle is preferably weighted, such as for example with concrete, to help anchor the receptacle to the bottom. The receptacle further includes rebar extending from the receptacle to penetrate the hard pack below the silt on the bottom.

11 Claims, 1 Drawing Sheet

UNDERWATER LIGHTING SYSTEM

FIELD OF THE INVENTION

The present invention relates generally to the field underwater lighting systems and, more particularly, to a lighting system that is deployed adjacent a structure for an aquascaping effect.

BACKGROUND OF THE INVENTION

Underwater lighting systems have been proposed since at least early in the twentieth century. In U.S. Pat. No. 867,256, Dion taught a subaqueous light system that served as an aid to navigation. This system comprised a cable laid along the deepest portion of bottom of a channel and included short cables leading to incandescent lamps. The lamps had floats attached to them so that the lamps would not rest on the bottom.

Other systems included lamps that were attached to floats so that the lamps would hang down into water to attract fish. U.S. Pat. No. 1,192,011 to Ryan, No. 1,338,528 to Reinewald, No. 4,187,533 to Hampton, No. 4,190,976 to Hurt, No. 4,598,346 to Bodde, and No. 5,651,209 to Rainey all describe variations on that concept. U.S. Pat. No. 2,097,357 to Watts describes an illuminated sinker to fishing, and U.S. Pat. No. 2,757,276 to Campbell illustrates a light on the end of a wand for attracting fish. U.S. Patent No. to Quereau describes an ornamental light system for a swimming pool to develop a changing light pattern by using mirrors on a curved surface.

Thus, it is known that placing a light underwater will attract fish. And Quereau teaches that an attractive light pattern may be developed underwater. However, none of these references discloses a permanently or semipermanently installed lighting system that is primarily directed to providing lighting from beneath the surface of a body of water to display what is underwater to those above the surface of the water.

What is really needed, though, is an underwater lighting system that can be deployed and left in place to provide an aquascape lighting arrangement.

SUMMARY OF THE INVENTION

The present invention addresses this need in the art. In one aspect, the present invention comprises a high intensity light in a polyvinyl chloride (PVC) receptacle and extension system. The receptacle is adapted to be releasably anchored on the bottom of a channel or an underwater area adjacent to a structure which provides alternating current (AC) power from a shoreside mains. The high intensity lamp may be sealed within a transparent enclosure, but is preferably left exposed to minimize sealife growth on the lamp. The PVC receptacle is preferably weighted, such as for example with concrete, to help anchor the receptacle to the bottom. The receptacle further includes rebar extending from the receptacle to penetrate the hard pack below the silt on the bottom.

In another aspect of this invention, a method of deploying an underwater lighting system is provided. A high intensity lamp is assembled into a PVC receptacle, the receptacle is joined to a predetermined length of conduit enclosing an electrical wire, and the assembly is deployed adjacent an electrical outlet available shore side. An inflated bladder, such as a balloon, is attached to or adjacent the receptacle, and the assembly is then floated to a point on the surface of the water above the point where the installation is desired. Then, the bladder is deflated, such as by bursting the balloon, and the assembly drops to the bottom. The ballast in the receptacle drives protruding rebar down below the silt covering the bottom of the channel, and into the hard pack underneath.

These and other features and objects of this invention will be apparent to those skilled in the art from a review of the following detailed description and the accompanying drawings.

DETAILED DESCRIPTION OF A PREFERRED EMBODIMENT

Figure 1:
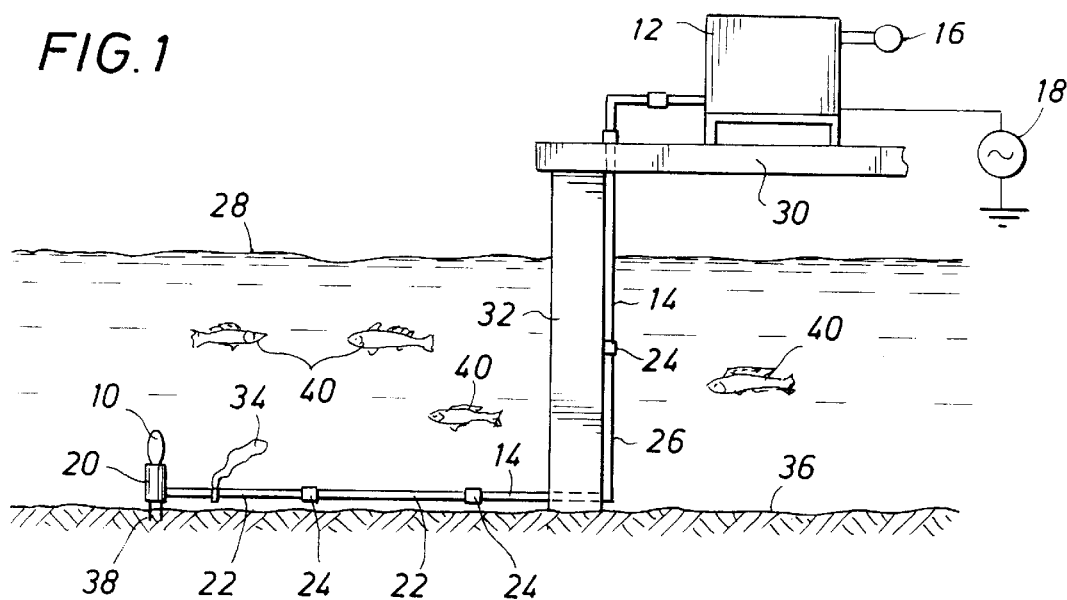
FIG. 1 is an overall schematic diagram of the underwater lighting system of this invention.

FIG. 1 depicts a schematic of the underwater lighting system of this invention. In a broad sense, the system comprises a high intensity lamp 10 joined to a transformer 12 by a conduit 14. The currently preferred lamp 10 is a mercury vapor lamp, but any other appropriate high intensity lamp may be used. The transformer is controlled by a light sensor 16 so that the light is energized at night. The transformer is also coupled to a mains 18 on shore.

The lamp 10 is mounted within a corrosion resistant receptacle 20, such as PVC. The receptacle 20 is joined and sealed to a horizontal run of conduit 22, such as PVC, which is in turn joined and sealed to another horizontal run of conduit 22 with a coupling 24, and so on, to make up the portion of the conduit 14 which runs along the channel bottom. If necessary, such coupling 24 may also be used in a vertical run 26 of the conduit 14 to adapt to the depth of the water 28. As shown in FIG. 1, the transformer 12 is preferably mounted upon a pier or dock 30, although it may be mounted wherever it may be securely located for access to the mains 18 and within easy reach of the conduit 14. The conduit 14 may also be secured to a vertical support 32 of the dock, if desired. Since electrical wire, described below in respect of FIG. 2, conducts AC electrical power to energize the light and the wire also represents a resistor in the circuit which generates heat, the distance from the lamp 10 to the transformer is preferably limited to about 50 feet. If a greater distance is presented by a particular installation, then larger gauge wire within the conduit should be used.

In placing the receptacle 20 in place on the bottom in a desired location, I have developed a technique for deploying the system which is a part of this invention. An inflatable bladder 34 (such as a balloon) is inflated and attached to the conduit 14 at a point near the receptacle 20. Then, the receptacle and conduit assembly is floated out onto the surface of the water 28. When the conduit 14 is fully extended from the dock 30, the bladder 34 is deflated (as by bursting the balloon) and the weighted receptacle sinks to the bottom 36, and is secured to the bottom as by mounting cleats 38.

When in place, and the lamp 10 is illuminated, then a variety of underwater sea life, such as fish 40, as clearly visible from the dock 30. It should be noted, once again, that the lamp 10 is preferably exposed to the water surrounding the assembly. It has been found that the hot lamp 10 retards the growth of marine organisms on the lamp far better than if the lamp 10 is enclosed within a transparent housing.

Figure 2:
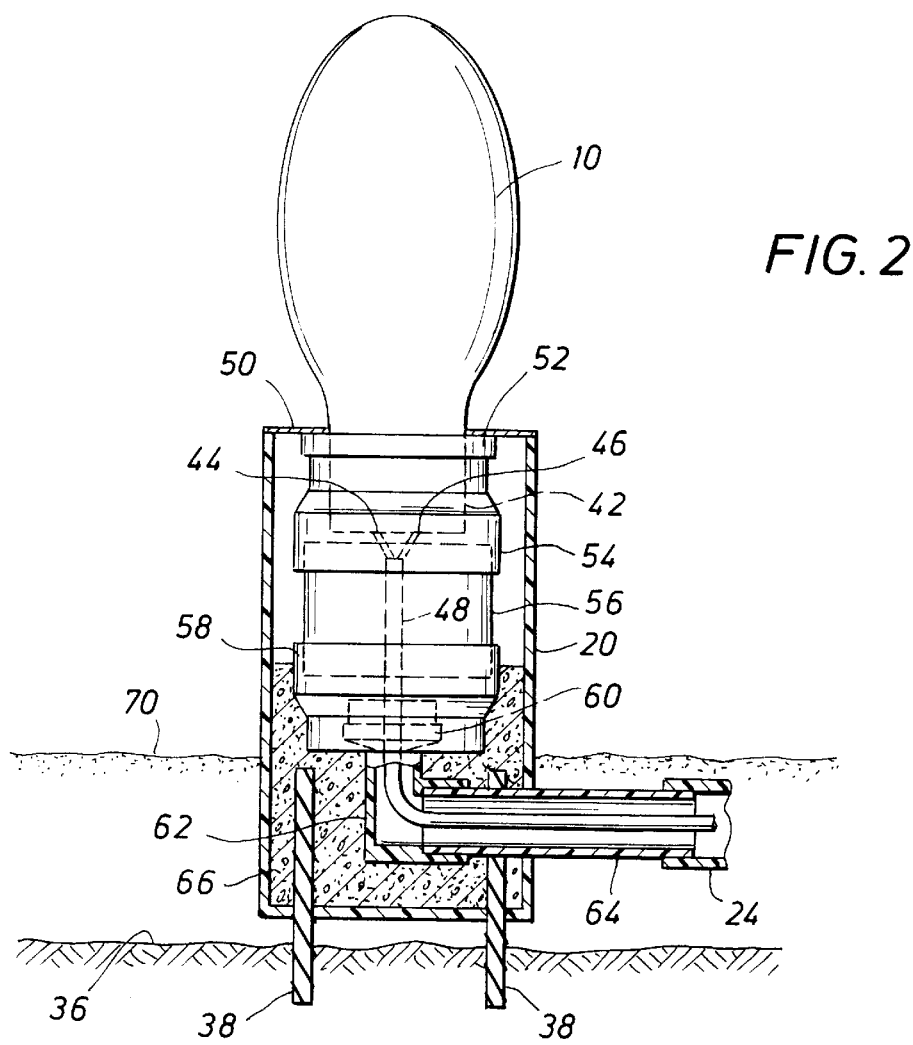
FIG. 2 is a side detail view in partial section of a PVC receptacle with a high intensity lamp installed in accordance with this invention.

FIG. 2 depicts further details of the receptacle 20 and associated couplings. The lamp 10, preferably a high intensity mercury vapor lamp from Phillips, is mounted into a socket 42, preferably a Phillips Mogul socket. The bottom of the socket 42 is provided with contacts 44 and 46, to which is electrically coupled a wire 48.

The receptacle 20 is covered at the top end with a cap 50 which is joined and sealed to a coupling reducer 52. An appropriate silicon or urethane sealant is also provided between the coupling reducer 52 and the socket 42. The socket is adapter to retain the lamp with a water-tight seal. The reducer 52 preferably has inside threads (not shown) to receive a coupling reducer 54. The coupling reducer 54 is joined and sealed to a run of extender pipe 56 which may be any appropriate length to customize the length of the pipe assembly retaining the socket within the receptacle 20. The extender pipe 56 is joined and sealed to a coupling reducer 58 which has a coupling adapter 60 on the inside. The coupling adapter 60 is joined and sealed to an elbow 62, to orient the receptacle 20 to a vertical position for the horizontal run 22 of conduit (FIG. 1).

The elbow 62 is joined and sealed to a short run of conduit 64 which penetrates the receptacle 20 to complete the receptacle assembly portion which carries the wire 48. When assembling the entire underwater system, the run of conduit 64 may then be simply joined and sealed to a coupling 24 (FIG. 1) to attach to the receptacle 20 to the conduit 14.

Those skilled in the art will recognize that the various components just described were selected so that the receptacle 20 could be assembled from off the shelf components. The entire PVC component, comprising the coupling 54, extender pipe section 56, coupling reducer 58, adapter 60 elbow 62 and conduit 64 could be formed as single component, as by molding. The single component serves to support the socket 42, retain the wire 48, penetrate the receptacle 20, and serve as one surface boundary for the ballast 66.

Prior to covering the receptacle with the cap 50, the interior of the receptacle is preferably filled with a ballast 66, and common concrete has proved to be ideal for this application. The ballast 66 helps to secure the cleats 38, of which there may be one or more, and preferably two such cleats. The cleats may be made of ⅜" rebar, and should extend below the receptacle 20 far enough to penetrate the hard pack bottom below a layer of silt 70. In this way, the cleats may be pulled up from the hard pack bottom, and the system refurbished and the lamp replaced.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. An underwater lighting system comprising:
   a. a lamp;
   b. a socket adapted to retain the lamp with a water-tight seal;
   c. an electrical conductor to electrically couple the socket to an electrical outlet;
   d. a non-conductive conduit retaining the socket and surrounding the electrical conductor; and
   e. a receptacle around the socket and a portion of the non-conductive conduit, the receptacle adapted to be mounted on the bottom of a body of water such that the lamp remains stationary in the water.

2. The system of claim 1, further comprising a ballast filling a portion of the receptacle.

3. The system of claim 1, further comprising an anchor adapted to releasably secure the receptacle to the bottom of the body of water.

4. The system of claim 1, wherein a portion of the non-conductive conduit forms an elbow within the receptacle.

5. The system of claim 1, wherein the lamp is adapted to operate immersed in contact with water.

6. The system of claim 1, wherein the conductor extends from the socket to a shoreside source of electrical power.

7. The system of claim 6, further comprising a dedicated transformer electrically coupled to the shoreside source of electrical power to the conductor to provide the source of electrical power to the system.

8. The system of claim 7, further comprising a photosensor coupled to the transformer such that electrical power is provided to the lamp only during time of darkness.

9. The system of claim 1, further comprising:
   a. a coupling reducer around the socket; and
   b. a cap over the receptacle to retain the coupling reducer to the receptacle.

10. The system of claim 1, wherein the lamp is a high intensity mercury vapor lamp.

11. A method of deploying an underwater lighting system, comprising the steps of:
    a. securing a lamp to one end of a conduit with a coupling, the conduit having a current carrying conductor therein;
    b. securing a deflatable bladder to the conduit;
    c. floating the conduit on a body of water, the deflatable bladder providing buoyancy to the conduit and lamp;
    d. locating the lamp at a predetermined position on the body of water; and
    e. deflating the bladder, thereby sinking the conduit and lamp.

* * * * *